(12) United States Patent
Conti et al.

(10) Patent No.: US 10,024,738 B2
(45) Date of Patent: Jul. 17, 2018

(54) CAPACITIVE MICRO-ELECTRO-MECHANICAL FORCE SENSOR AND CORRESPONDING FORCE SENSING METHOD

(71) Applicant: STMicroelectronics S.r.l., Agrate Brianza (IT)

(72) Inventors: Sebastiano Conti, Mistretta (IT); Daniele Prati, Catania (IT); Domenico Giusti, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 320 days.

(21) Appl. No.: 14/539,640

(22) Filed: Nov. 12, 2014

(65) Prior Publication Data
US 2015/0135860 A1 May 21, 2015

(30) Foreign Application Priority Data
Nov. 15, 2013 (IT) .............................. TO2013A0931

(51) Int. Cl.
*G01L 1/14* (2006.01)

(52) U.S. Cl.
CPC .............. *G01L 1/142* (2013.01); *G01L 1/148* (2013.01)

(58) Field of Classification Search
CPC . G01L 1/142; G01L 1/148; G01L 1/14; G01L 1/144; G01L 1/146
USPC .................................................... 73/862.626
See application file for complete search history.

(56) References Cited

U.S. PATENT DOCUMENTS

| | | | | | |
|---|---|---|---|---|---|
| 3,993,939 | A | * | 11/1976 | Slavin ...................... | H01G 5/16 361/278 |
| 4,266,263 | A | * | 5/1981 | Haberl .................... | G08B 13/26 177/210 C |
| 4,479,392 | A | * | 10/1984 | Froeb ........................ | G01L 1/14 338/47 |
| 5,186,054 | A | * | 2/1993 | Sekimura .............. | G01L 9/0072 361/283.4 |
| 5,693,886 | A | * | 12/1997 | Seimiya .................. | G01L 1/142 73/718 |
| 6,109,113 | A | * | 8/2000 | Chavan ................... | B81B 7/007 73/706 |
| 6,151,967 | A | * | 11/2000 | McIntosh .............. | B81B 3/0086 361/283.4 |

(Continued)

FOREIGN PATENT DOCUMENTS

WO     2013/073506 A1    5/2013

*Primary Examiner* — Lisa Caputo
*Assistant Examiner* — Nathaniel T Woodward
(74) *Attorney, Agent, or Firm* — Seed Intellectual Property Law Group LLP

(57) ABSTRACT

A MEMS force sensor has: a substrate; a fixed electrode coupled to the substrate; and a mobile electrode suspended above the substrate at the fixed electrode to define a sensing capacitor, the mobile electrode being designed to undergo deformation due to application of a force to be detected. A dielectric material region is set on the fixed electrode and spaced apart by an air gap from the mobile electrode, in resting conditions. The mobile electrode comes to bear upon the dielectric material region upon application of a minimum detectable value of the force, so that a contact surface between the mobile electrode and the dielectric material region increases, in particular in a substantially linear way, as the force increases.

21 Claims, 8 Drawing Sheets

(56) References Cited

U.S. PATENT DOCUMENTS

| | | | | |
|---|---|---|---|---|
| 6,153,917 A * | 11/2000 | Matsunaga | ......... | G01P 15/0802 |
| | | | | 216/2 |
| 6,626,046 B2 * | 9/2003 | Taguchi | ................. | G01L 1/205 |
| | | | | 73/753 |
| 6,860,154 B2 * | 3/2005 | Yamamoto | ........... | G01L 9/0073 |
| | | | | 73/216 |
| 7,082,024 B2 * | 7/2006 | Casset | ...................... | H01G 5/18 |
| | | | | 361/277 |
| 7,489,004 B2 * | 2/2009 | Combi | .................... | H01G 5/18 |
| | | | | 257/312 |
| 7,642,612 B2 * | 1/2010 | Izumi | ................. | B81C 1/00246 |
| | | | | 257/415 |
| 7,724,494 B2 * | 5/2010 | Shimanouchi | ........... | H01G 5/18 |
| | | | | 361/278 |
| 8,149,496 B2 * | 4/2012 | Kothari | ................ | G02B 26/001 |
| | | | | 359/237 |
| 8,621,942 B2 * | 1/2014 | Sleeman | ................. | G01L 1/146 |
| | | | | 73/862.626 |
| 2004/0206190 A1 * | 10/2004 | Kawahata | ........... | A61B 5/1172 |
| | | | | 73/862 |
| 2004/0227736 A1 | 11/2004 | Kamrath et al. | | |
| 2006/0053889 A1 * | 3/2006 | Yamamoto | .............. | F16F 1/326 |
| | | | | 73/514.16 |
| 2008/0202251 A1 * | 8/2008 | Serban | .................... | G01L 1/142 |
| | | | | 73/780 |
| 2011/0232390 A1 * | 9/2011 | Matsumoto | ............ | C08G 18/12 |
| | | | | 73/728 |
| 2012/0133005 A1 * | 5/2012 | Langeries | ............. | B06B 1/0292 |
| | | | | 257/416 |
| 2013/0199311 A1 * | 8/2013 | Horie | ...................... | G01L 1/142 |
| | | | | 73/862.626 |
| 2014/0125897 A1 * | 5/2014 | Toyoda | .................... | H01G 5/18 |
| | | | | 349/33 |

* cited by examiner

CAPACITIVE MICRO-ELECTRO-MECHANICAL FORCE SENSOR AND CORRESPONDING FORCE SENSING METHOD

BACKGROUND

Technical Field

The present disclosure relates to a micro-electro-mechanical, in the following MEMS (Micro-Electro-Mechanical System), force sensor of a capacitive type and to a corresponding force sensing method.

Description of the Related Art

The increasing use is known of sensors including micromechanical sensing structures, made at least in part of semiconductor materials and using MEMS technology, for example in portable electronic apparatuses, such as tablets, smartphones, digital audio players, photographic or video cameras and consoles for videogames.

MEMS sensors have a number of advantageous features, amongst which extremely compact dimensions, reduced consumption levels and good electrical performance and may be used, for example, for the provision of UIs (User Interfaces) for portable electronic apparatuses.

A MEMS sensor generally comprises: a micromechanical sensing structure, designed to transduce a mechanical quantity to be detected (for example, a force) into an electrical quantity (for example, a capacitive variation, in the case of capacitive sensing structures); and an electronic reading circuit, usually integrated as an ASIC (Application-Specific Integrated Circuit), designed to carry out appropriate processing operations (amongst which operations of amplification and filtering) on the transduced electrical quantity, in order to supply an electrical output signal, whether analog (for example, a voltage), or digital. This electrical signal is made available for an external electronic apparatus (the so-called "host") incorporating the MEMS sensor; for example, it is received at input by a microprocessor control unit of the electronic apparatus.

The micromechanical sensing structure of a MEMS sensor of a capacitive type generally comprises a mobile electrode, made as a diaphragm or membrane, set facing a substantially fixed electrode, being separated from the latter by an air gap (or separation region). The mobile electrode is generally anchored elastically, by a perimetral portion thereof, to a substrate, while a central portion thereof is free to move or bend in response to the quantity to be detected (for example, a force acting on the mobile electrode). The mobile electrode and the fixed electrode form the plates of a sensing capacitor and bending of the membrane that constitutes the mobile electrode causes a variation of capacitance of the sensing capacitor, due to the variation of the height or thickness of the air gap separating the electrodes.

Known solutions for MEMS force sensors of a capacitive type have certain disadvantages, linked in particular to a reduced detection sensitivity for low values of the applied force.

In this regard, FIG. 1 shows a typical plot of the sensing capacitance, designated by C, as a function of the applied force, designated by F, in a MEMS force sensor of a known type (the relation capacitance vs. applied force refers in this case to a simple system with a capacitor with plane and parallel faces). The plot shows a low value of sensitivity in a wide range of force values, in the example between 0 and approximately 500 gram-force (gf).

BRIEF SUMMARY

One or more embodiments of the present disclosure is directed to a MEMS force sensor and a corresponding force sensing method.

In one embodiment, there is provided A MEMS force sensor that includes a substrate, a fixed electrode coupled to the substrate, and a mobile electrode suspended above the substrate and facing the fixed electrode. The mobile electrode and the fixed electrode define a sensing capacitor. A dielectric material is located on the fixed electrode and spaced apart from the mobile electrode by an air gap when the mobile electrode is in a rest condition. The mobile electrode is configured to undergo deformation in response to a force. The mobile electrode includes a contact surface that is configured to contact the dielectric material in response to the force. Additionally, an area of the contact surface increases as the force increases.

BRIEF DESCRIPTION OF THE SEVERAL VIEWS OF THE DRAWINGS

For a better understanding of the present disclosure, preferred embodiments thereof are now described, purely by way of non-limiting example and with reference to the attached drawings, wherein.

DETAILED DESCRIPTION

Figure 1:
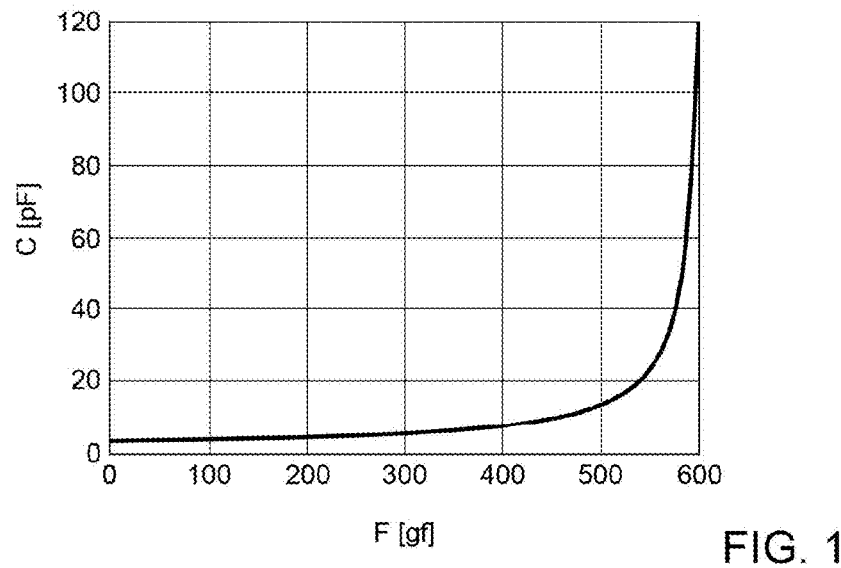
FIG. 1 shows a plot related to the sensing performance of a MEMS force sensor of a known type.
Figure 2:
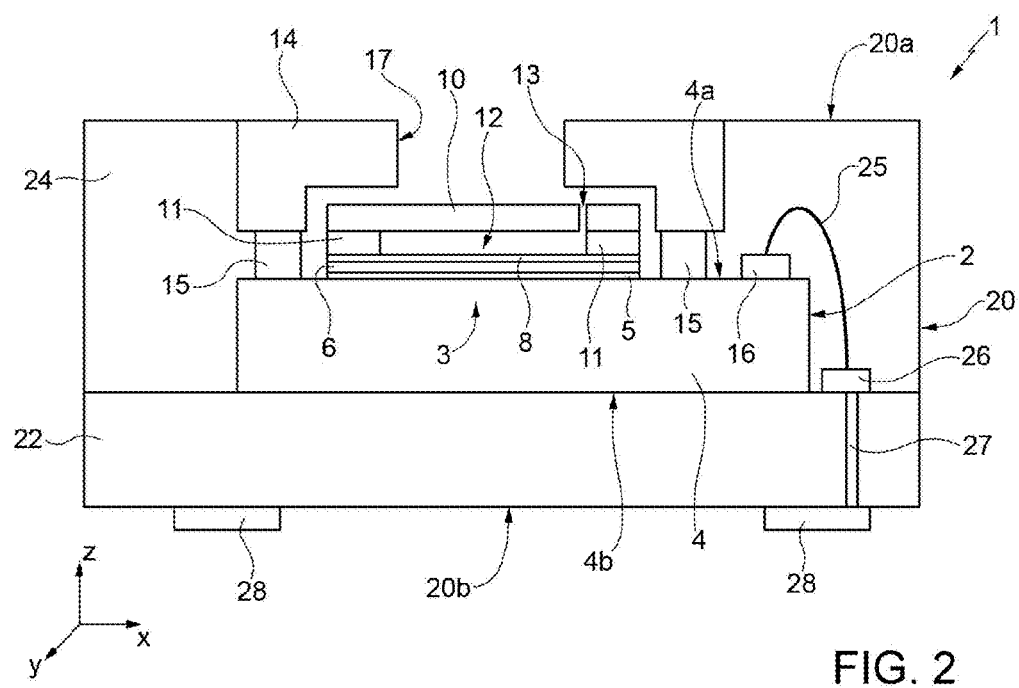
FIG. 2 is a schematic cross-sectional view of a MEMS force sensor, according to a first embodiment of the present solution.

As shown in FIG. 2, a MEMS force sensor, designated as a whole as 1, comprises a die 2, in which a force sensing structure 3 is made.

The die 2 comprises a substrate 4, for example made of a solid body, without openings, including semiconductor material, for example silicon, having a front main surface 4a and a rear main surface 4b, both of which have a planar extension in a horizontal plane xy and which are opposite to one another along a vertical axis z, transverse to the horizontal plane xy.

On the front main surface 4a of the substrate 4 an insulating region 5 is present, for example of silicon oxide, having a layer conformation.

The force sensing structure 3 comprises a first sensing electrode 6 set on the insulating region 5, in particular operating as stator, i.e., the fixed electrode (as it will be referred to hereinafter). The fixed electrode 6 is made, for example, of polysilicon, or of metal material.

The force sensing structure 3 further comprises a dielectric region 8, having a layer conformation, arranged on the sensing electrode 6, of a solid dielectric material, for example silicon nitride. Alternatively, the dielectric region 8 is made of a different dielectric material having a relative dielectric constant greater, preferably much greater, than that of air, for example having a value at least five times greater. The thickness of the dielectric region 8 is, for example, smaller than, or equal to, 0.2 μm.

The insulating region 5, the fixed electrode 6 and the dielectric region 8 may be obtained by deposition and subsequent etching via photolithographic technique, of respective layers of material.

The force sensing structure 3 further comprises a second sensing electrode 10, in particular operating as rotor, i.e., the mobile electrode (as it will be referred to hereinafter); also the mobile electrode 10 is made, for example, of polysilicon, or of metal material.

The mobile electrode 10 is set above the dielectric region 8, suspended by a spacer region 11, for example, of silicon oxide or some other dielectric material, which rests on the same dielectric region 8. In the embodiment illustrated in FIG. 2, the mobile electrode 10 and the dielectric region 8 have substantially the same size in the horizontal plane xy (in a direction transverse to the vertical stacking direction).

The mobile electrode 10 defines a membrane, suspended over the dielectric region 8 and separated from the latter by an air gap 12.

A peripheral region of the mobile electrode 10 is in contact with the spacer region 11 and constitutes an anchorage region for the same membrane with respect to the substrate 4.

Figure 3:
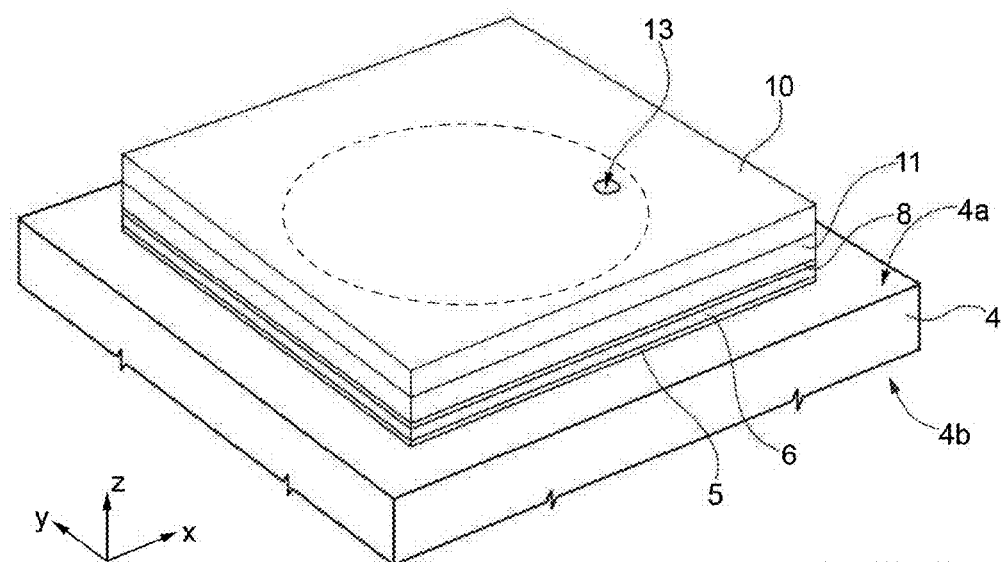
FIG. 3 is a schematic perspective top view of a portion of the sensor of FIG. 2.

As illustrated in FIG. 3, the mobile electrode 10 may have in top plan view, in the horizontal plane xy, a substantially square, or circular shape (the latter possibility being represented with a dashed line). In both of these embodiments, the mobile electrode 10 is anchored to the spacer region 11 along an entire perimeter thereof.

Further, a hole 13 is made through the mobile electrode 10, thus setting the air gap 12 in fluid communication with a space overlying the mobile electrode 10, for providing a pressure equalization function.

The manufacturing process may, for example, envisage deposition of a layer of silicon oxide, or other suitable material, on the dielectric region 8, designed for formation of the spacer region 11 and subsequently deposition of a layer of polysilicon, or some other suitable material, on the silicon-oxide layer. These layers may be defined by etching with photolithographic technique for definition of their dimensions in the horizontal plane xy. By chemical etching, the hole 13 can be made in the polysilicon layer and, through the same hole 13, an etching may be carried out for selective removal of the underlying silicon-oxide layer, for definition of the air gap 12 and the spacer region 11.

The MEMS force sensor 1 further comprises a cap element 14, bonded to the front main surface 4a of the substrate 4 of the die 2, so as to overlie the force sensing structure 3 and in particular the fixed and mobile electrodes 6, 10.

In particular, a bonding region 15, for example of solder paste and defined using the screen-printing technology, completely surrounds the fixed electrode 6 in the horizontal plane xy; for example, the bonding region 15 has a ring-like conformation.

On the outside of the bonding ring 15, on the front main surface 4a of the substrate 4, one or more electrical contact pads 16 are present, electrically connected to the force sensing structure 3 (and in particular to the fixed and mobile electrodes 6, 10) by buried electrical-connection regions (not illustrated), made in a surface portion of the substrate 4, in an area corresponding to the front main surface 4a.

Further, an opening 17 is made through the cap element 14, in a position vertically corresponding to the force sensing structure 3 and in particular to the membrane of the mobile electrode 10.

The MEMS force sensor 1 further comprises a package 20, which in FIG. 2 is of the so-called "full-molded" HLGA (Holed-Land Grid Array) type. It is in any case evident that, in a substantially equivalent way, a package of a BGA (Ball-Grid Array) type could be provided.

In a way that is usual in this field, the term "package" is used herein to denote the casing or coating that surrounds, totally or in part, the die or dice of semiconductor material of the MEMS sensor, enabling electrical connection thereof from the outside (for example, with a technique of surface mounting on a printed circuit—SMD).

In detail, the package 20 comprises a base support 22, on which the substrate 4 is attached via an adhesion layer (not illustrated), at the rear main surface 4b; the base support 22 is, for example, a multilayer organic substrate, defines the base of the package 20 and has a size in the horizontal plane xy greater than that of the die 2, having side portions not covered by the same die 2.

The package 20 further comprises a coating 24, for example, of resin and obtained via printing techniques, which surrounds the die 2 and coats the lateral portions of the base support 22 at the top, without however coating the outer surface of the cap element 14, which thus forms part of a first outer face 20a of the package 20. In particular, the coating 24 does not cover the opening 17, which is thus accessible from outside the package 20 and constitutes an access port towards the internal space of the same package 20.

Further, wire electrical connections 25 (obtained with the wire-bonding technique) connect the electrical contact pads 16 to further electrical contact pads 26, arranged in areas corresponding to the aforesaid lateral portions of the base support 22, and through electrical connections 27, obtained through the base support 22, connect the further electrical contact pads 26 to external contact pads 28, for example, of metal material, carried by an outer surface of the base support 22, defining a second outer face 20b of the package 20 (designed, for example, for contacting a printed circuit board).

The contact pads 28 constitute the electrical input/output interface towards the outside of the package 20. In a known manner, in the case of a BGA package, conductive bumps, for example metal ball elements (not shown), may instead be provided for this purpose, set in electrical contact with the through electrical connections 27.

The overall dimensions of the package 20 are particularly reduced; for example, they may be of the order of 2 mm×2 mm in the horizontal plane xy and 0.6 mm along the vertical axis z.

Figure 4:
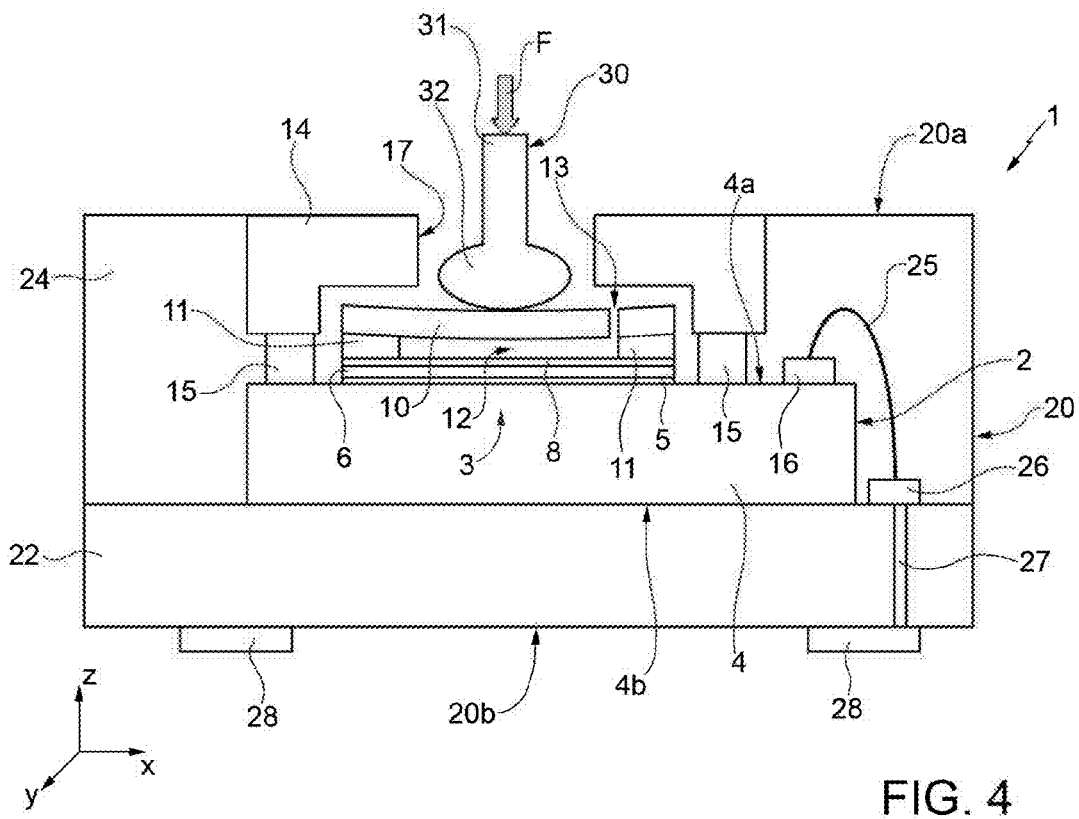
FIG. 4 is a schematic illustration of an operating condition of detection of an applied force, for the sensor of FIG. 2.

During operation, and as illustrated schematically in FIG. 4, application of a force F to the MEMS force sensor 1 causes deformation of the membrane of the mobile electrode 10 in the direction of the underlying substrate 4.

The force F may, for example, be applied by a piston element 30, having a stem 31 and a head 32, which, introduced along the vertical axis z into the opening 17, exerts a contact force on the mobile electrode 10 (which also acts substantially along the vertical axis z).

For example, the head 32 has an elliptical conformation in cross-section, having a radius of curvature around the area of contact with the mobile electrode 10 preferably of not less than 40 mm and a diameter of contact preferably of not less than ⅓ of the surface of the membrane. The aforesaid radius of curvature is given in particular by the following expression:

$$R = d_m^2/(2 \cdot gap)$$

where $d_m$ is the diameter of the membrane and gap is the value of the air gap 12.

In particular, when the value of the force F exceeds a threshold value $F_{th}$, which also represents the minimum value of force that can be detected by the MEMS force sensor 1, the mobile electrode 10 bears upon, i.e., comes into contact with the underlying dielectric region 8, at a region corresponding to a central portion of the membrane. The force sensing structure 3 is designed in such a way that the threshold value $F_{th}$ is very low, for example, of the order of 20 gf (this value may in each case vary according to the specification and, moreover, according to the air gap).

As the applied force F increases, the area of contact between the facing surfaces of the mobile electrode 10 and of the dielectric region 8 increases progressively in so far as the deformation of the membrane of the mobile electrode 10 determines a progressive "flattening" thereof on the same dielectric region 8.

Figure 5:
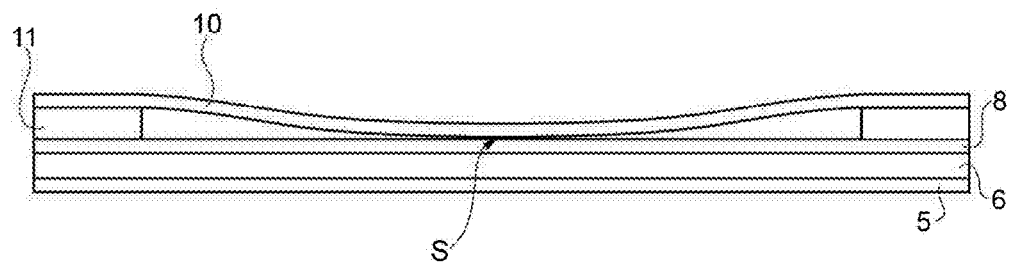
FIG. 5 is a schematic illustration of a deformation of a portion of the sensor of FIG. 4, upon application of the force to be detected.

This phenomenon is highlighted also in FIG. 5, which shows the deformation of the mobile electrode 10 due to application of the force F, and the contact area with the underlying dielectric region 8, designated by S.

Figure 6A:
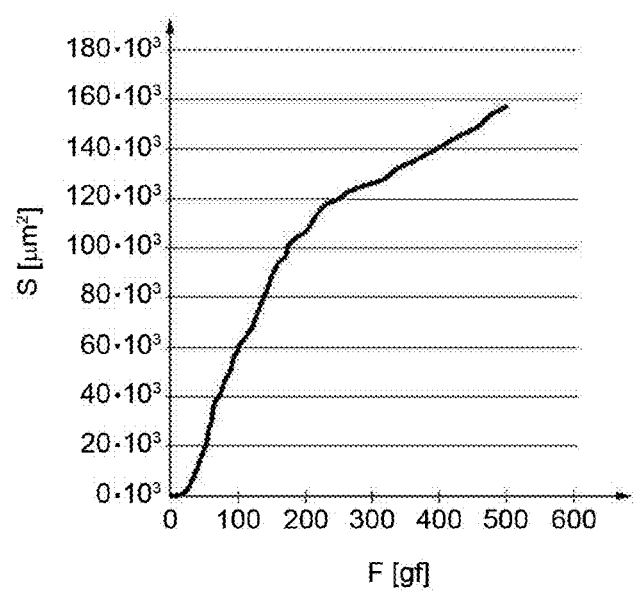
FIGS. 6a-6c show plots related to the performance in detection of a force, for the sensor of FIG. 2.

In particular, as illustrated in FIG. 6a, the contact area S increases in a substantially linear way (i.e., proportionally) as the applied force F varies, for a wide range of values of the same force F (the area of contact S evidently being zero, for values of force F less than the threshold value $F_{th}$).

Figure 6B:
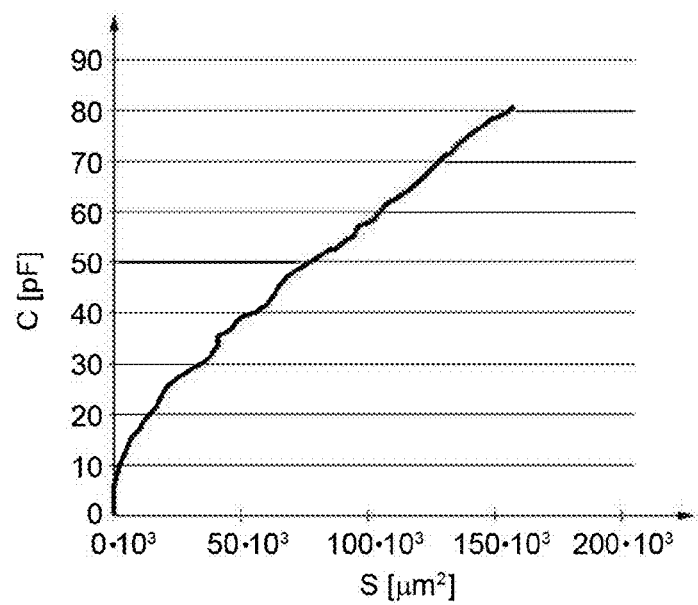

As shown in FIG. 6b, the value of the capacitance, designated by C, of the sensing capacitor formed between the fixed and mobile electrodes 6, 10 undergoes a substantially linear increase as the contact area S (and thus the applied force F) varies.

A particular aspect of the present solution thus envisages exploiting, for the purposes of detection of the value of the applied force F, the substantially linear increase of the contact area S between the dielectric region 8 and the mobile electrode 10, which undergoes deformation and comes into physical contact with the same dielectric region 8; this increase causing a corresponding variation (which is also linear) of the capacitance C of the sensing capacitor that the mobile electrode 10 forms with the underlying fixed electrode 6.

It should be noted that the air gap 12, as regards the aforesaid capacitance C of the sensing capacitor, is substantially negligible, given the high value of the dielectric constant of the dielectric region 8.

Figure 6C:
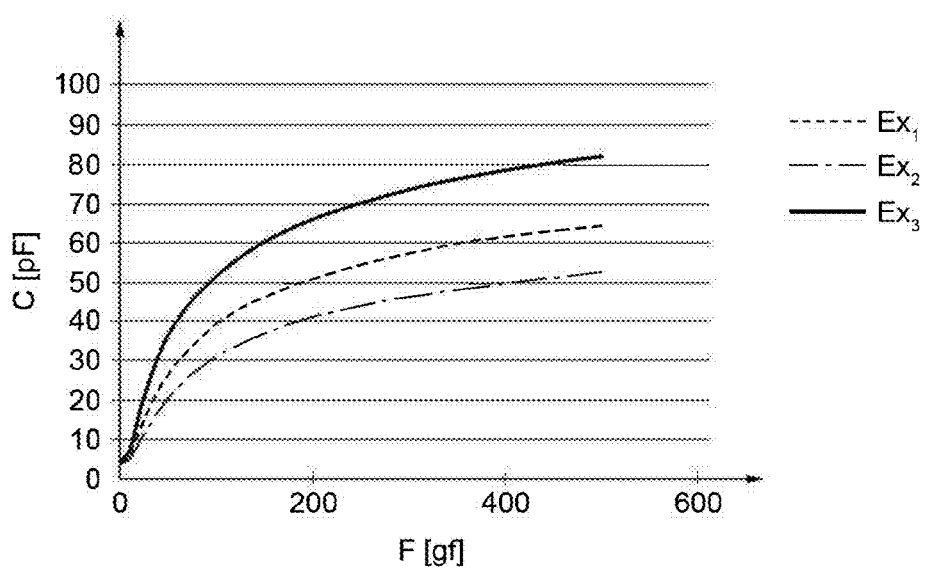

As highlighted by the plot in FIG. 6c, which shows the resulting variation of the value of capacitance C as a function of the applied force F, there is a wide range of values where the same plot is substantially linear. Moreover, the detection sensitivity (as highlighted by the slope of the curve) is very high for low values of the force F (in the example, for values of less than 100-200 gf).

In particular, FIG. 6c shows three different slopes of the capacitance vs. force detection curve, for respective dimensional ratios of the sensing structure 3 of the MEMS force sensor 1, in particular as regards: the thickness of the membrane of the mobile electrode 10, which has values, provided by way of example, of 24 μm (Example 1), 24.5 μm (Example 2) and 25 μm (Example 3); the height, or thickness, in resting conditions, of the air gap 12 along the vertical axis z, which has values, provided by way of example, of 1.8 μm (Example 1), 2 μm (Example 2) and 1.6 μm (Example 3); and the thickness of the dielectric region 8, which has values, provided by way of example, of 0.25 μm (Example 1), 0.3 μm (Example 2) and 0.2 μm (Example 3).

In general, the MEMS force sensor 1 has excellent sensing characteristics in a range of force F between the threshold value $F_{th}$, which, as highlighted previously, represents a minimum detectable value of force F and a maximum detectable value of force, for example 500 gf.

It should be clear that the force sensing structure 3 of the MEMS force sensor 1 may be appropriately designed, in terms of materials, dimensions and in general mechanical characteristics, in such a way as to obtain a desired plot of the detection curve of the capacitance C vs. force F applied.

Figure 7:
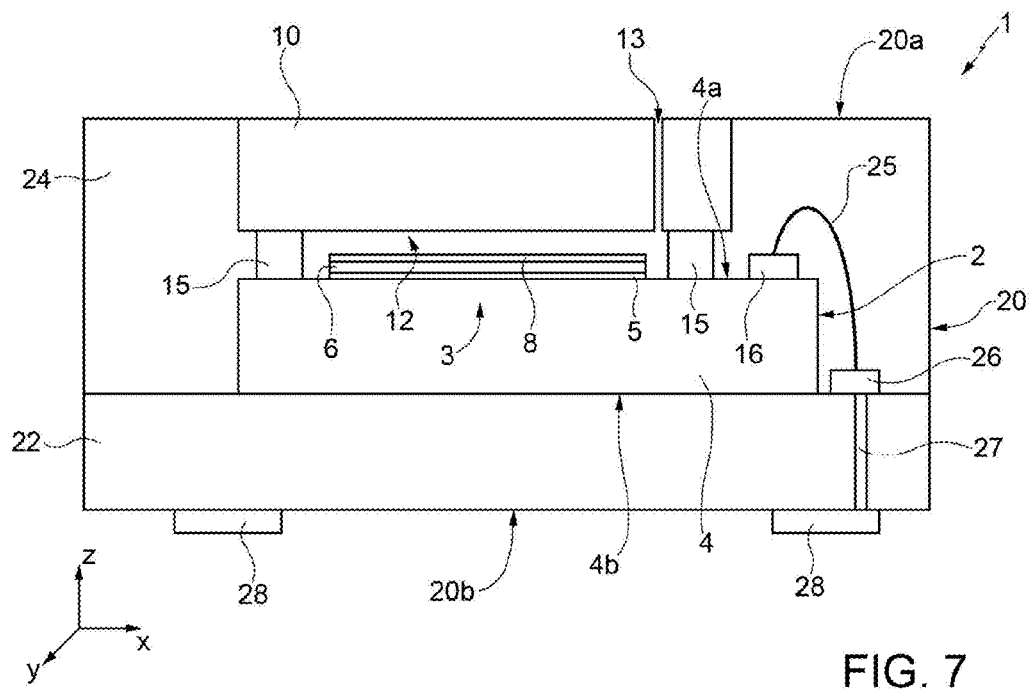
FIG. 7 is a schematic cross-sectional view of a MEMS force sensor, according to a further embodiment of the present solution.

With reference to FIG. 7, a different embodiment of the MEMS force sensor, once again designated by 1, is now described.

This embodiment differs from the one described previously with reference to FIG. 2 in that the mobile electrode 10 also operates as a cap element (which consequently here is not present), defining part of the first outer face 20a of the package 20 and being thus in direct contact with the environment external to the same package 20.

In this case, the mobile electrode 10 is bonded to the front main surface 4a of the substrate 4 of the die 2 by the bonding region 15, so as to be suspended above the dielectric region 8. The bonding region 15 thus replaces the spacer region 11 of FIG. 2.

Also in this case, the resulting dimensions of the MEMS force sensor 1 are extremely compact, in the example, in the region of 2.5 mm×2.5 mm in the horizontal plane xy, and of 0.6 mm along the vertical axis z. The thickness of the mobile electrode 10 is greater than that in the embodiment of FIG. 2, for example approximately twice as much, for example in order to guarantee a sufficient sturdiness for the package 20 of the MEMS force sensor 1.

General operation of the MEMS force sensor 1 does not differ from what has been described previously.

Figure 8:
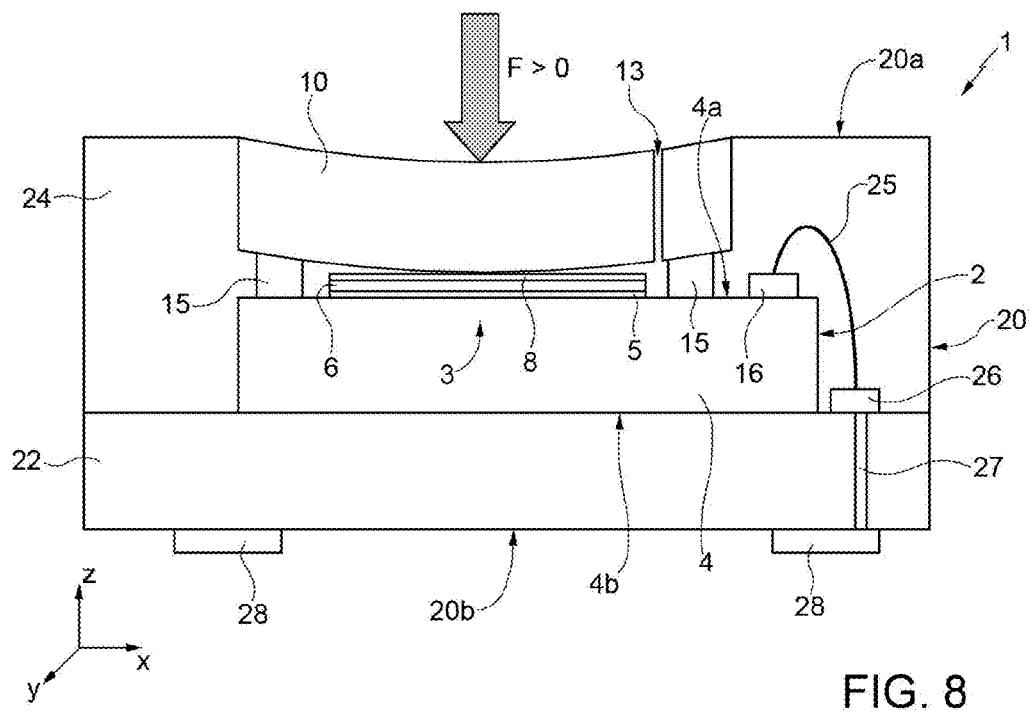
FIG. 8 is a schematic illustration of an operating condition of detection of an applied force, for the sensor of FIG. 7.

In this regard, FIG. 8 shows the deformation of the sensing structure 3 following upon application of the force F, which acts on the exposed portion of the mobile electrode 10.

Figure 9:
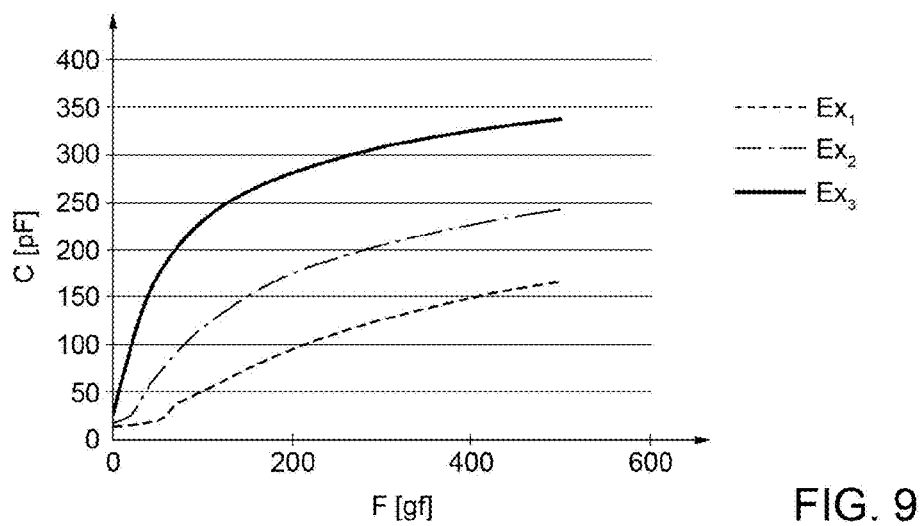
FIG. 9 shows plots regarding the performance in detection of a force, for the sensor of FIG. 7.

Further, FIG. 9 shows three different slopes of the capacitance vs. force detection curve, corresponding to respective dimensional ratios of the sensing structure 3 of the MEMS force sensor 1, once again as regards: the thickness of the membrane of the mobile electrode 10, which has values, provided by way of example, of 60 µm (Example 1), 50 µm (Example 2) and 40 µm (Example 3); the height, in resting conditions, of the air gap 12 along the vertical axis z, which has values, provided by way of example, of 1.3 µm (Example 1), 1 µm (Example 2) and 0.7 µm (Example 3); and the thickness of the dielectric region 8, which has values, provided by way of example, of 0.16 µm (Example 1), 0.15 µm (Example 2) and 0.14 µm (Example 3).

Figure 10:
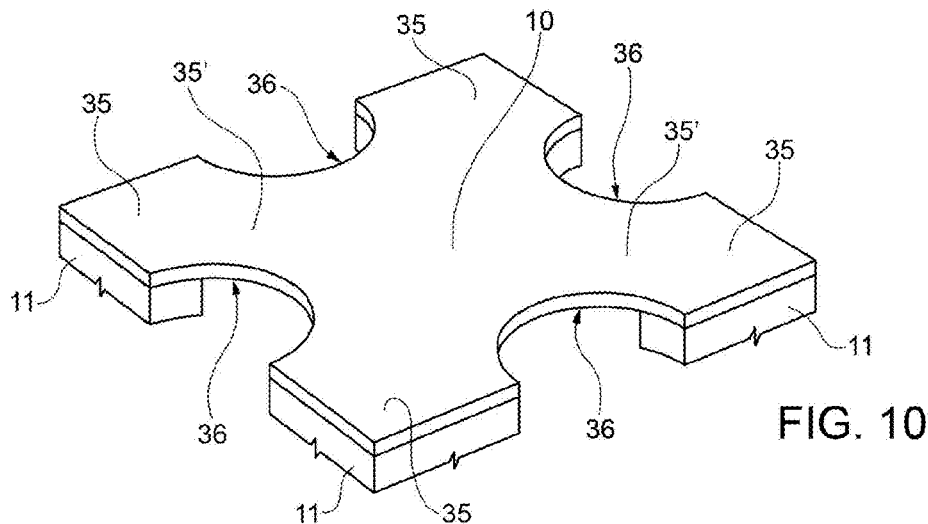
FIG. 10 is a schematic perspective top view of a portion of the MEMS force sensor, according to a variant of the present solution.

FIG. 10 shows a different shape for the membrane of the mobile electrode 10, which is in this case anchored to the underlying substrate 4 (by the spacer region 11, appropriately shaped) at corner or edge portions 35 thereof.

In particular, the mobile electrode 10 has, in this embodiment, a plurality of cavities 36 (in the example, four in number), which extend in positions corresponding to its sides, with a semicircular conformation in the horizontal plane xy, defining the edge portions 35 and their prolongations 35' towards the membrane of the mobile electrode 10.

Given the conformation of the structure, the prolongations 35' of the edge portions 35 have an elastic function, bestowing greater flexibility on the membrane, for its deformation along the vertical axis z.

Figure 11:
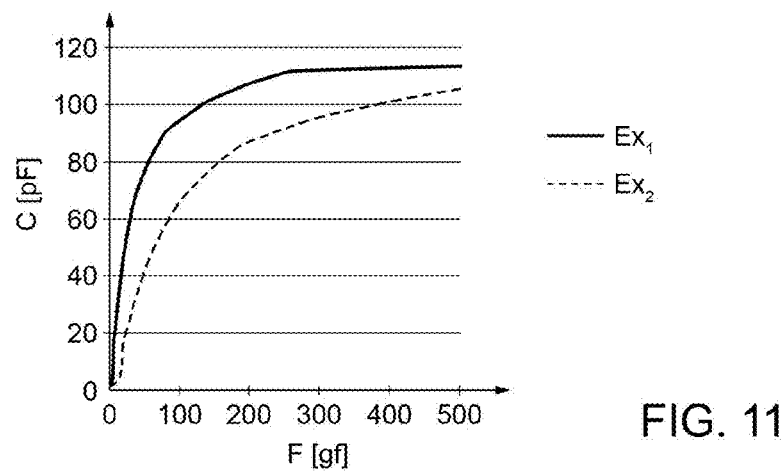
FIG. 11 shows plots regarding the performance in detection of a force for the sensor of FIG. 10.

FIG. 11 shows two capacitance vs. force detection curves for the force sensing structure 3 shown in FIG. 10, with different sizing values (assuming in any case dimensions of the mobile electrode 10 in the horizontal plane xy of 1300 µm×1300 µm and a radius of the cavities 36 of 300 µm), once again as regards: the thickness of the membrane of the mobile electrode 10, which has values, provided by way of example, of 75 µm (Example 1) and 50 µm (Example 2); the height, in resting conditions, of the air gap 12 along the vertical axis z, which has a value, provided by way of example, of 1.6 µm, in both cases; and the thickness of the dielectric region 8, which has a value, provided by way of example, of 0.2 µm, in both cases.

Figure 12:
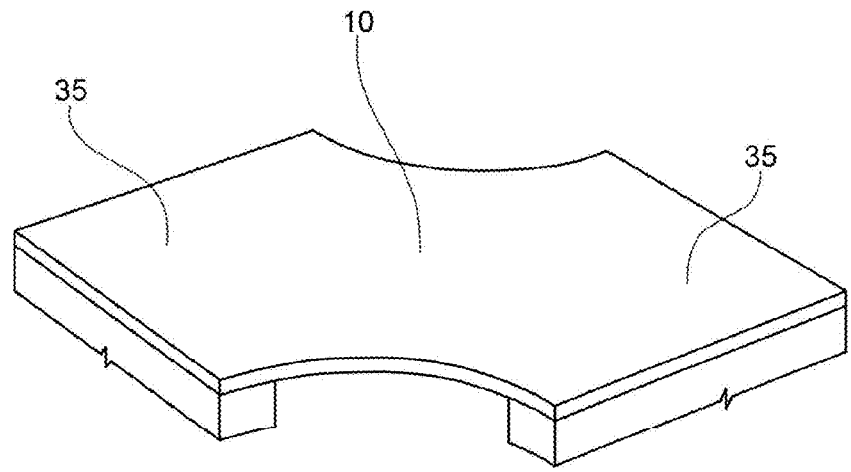
FIG. 12 is a schematic perspective top view of a portion of the MEMS force sensor, according to a variant of the present solution.

FIG. 12 illustrates a further variant embodiment, in which the membrane of the mobile electrode 10 has two edge portions 35, for anchorage to the underlying substrate 4.

Figure 13:
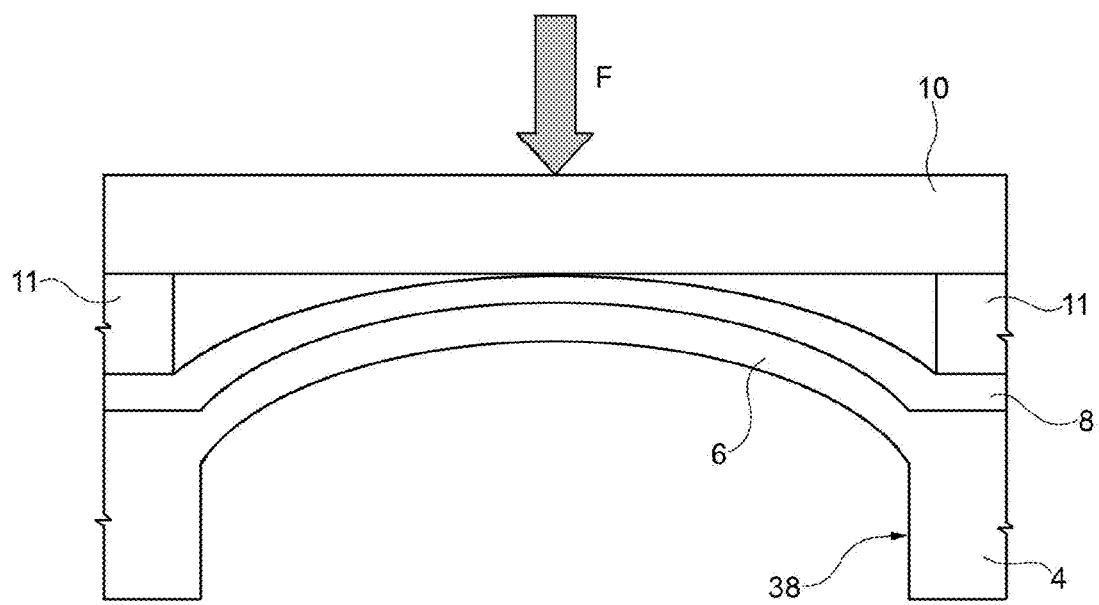
FIG. 13 is a schematic cross-sectional view of a portion of the MEMS force sensor, according to a further embodiment.

Yet another different embodiment, illustrated schematically in FIG. 13, envisages use as fixed electrode 6, of a thin surface portion of the substrate 4, defined by etching from the back of the substrate 4, which leads to definition of a cavity 38.

Deposited on the fixed electrode 6 is a dielectric layer, for example of silicon nitride or silicon oxide, markedly stressed, for the formation of the dielectric region 8.

On account of the stresses inherent in the deposited material, the fixed electrode 6 undergoes a bending phenomenon, so-called "buckling", approaching, at a central portion thereof, the mobile electrode 10.

Advantageously, in this embodiment, a force F of a very low value is sufficient for the mobile electrode 10 to come to bear upon the dielectric region 8. Consequently, the minimum detectable value of force F is lower than that in the solutions discussed previously.

The advantages of the solution described emerge clearly from the foregoing discussion.

In particular, it is once again emphasized that the MEMS force sensor 1 has improved electrical characteristics as compared to known solutions, in particular having a high sensitivity for low values of the applied force F.

The MEMS force sensor 1 thus finds advantageous use in applications where it is desired detection, with a high sensitivity, of forces having a value that is not high, for example ranging between 20 and 1000 gf.

Figure 14:
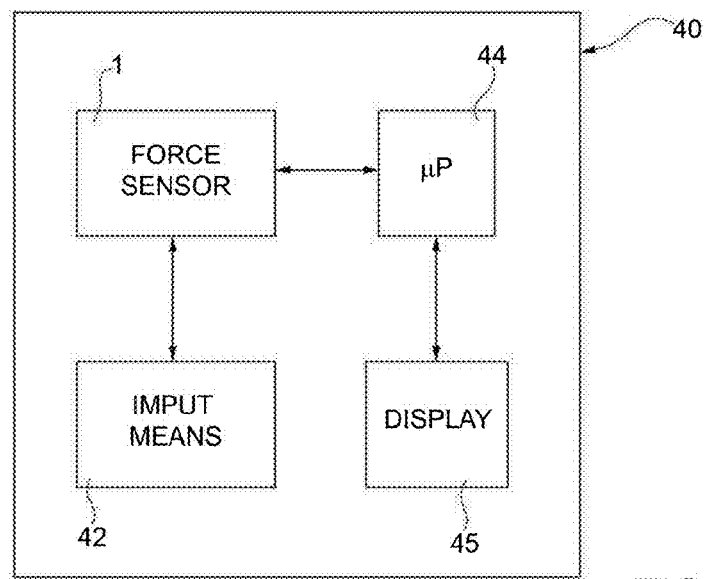
FIG. 14 is an overall block diagram of an electronic apparatus, in which the MEMS force sensor according to the present solution is used.

For example, FIG. 14 shows an electronic apparatus 40, for instance, of a portable type, such as a tablet, a smart-phone, a digital audio player, a photographic or video camera, wearable device, or a console for videogames, which integrates the MEMS force sensor 1.

The electronic apparatus 40 comprises input means 42, including keys or similar actuation elements, which are operated by a user, for example in order to carry out a desired action within a user interface.

The electronic apparatus 40 further comprises: a microprocessor unit 44, designed to manage general operation thereof; and a display element 45, appropriately controlled by the microprocessor unit 44.

The MEMS force sensor 1 is coupled to at least one of the input means 42, for detecting actuation thereof and in particular the amount of the same actuation (in terms, for example, of the force exerted by the user during actuation).

The microprocessor unit 44 receives, and possibly processes, the electrical signal detected by the MEMS force sensor 1, which indicates the amount of the actuation and generates corresponding controls for the user interface displayed on the display element 45. For example, the microprocessor unit 44 may include in the memory information on the capacitance vs. force curve of the force sensing structure 3 of the MEMS force sensor 1, in such a way as to determine the value of the force F, as a function of the variation of the detected capacitance.

The MEMS force sensor 1 also has compact dimensions and the method for its manufacturing is simple and economically advantageous.

The first embodiment described with reference to FIG. 2 may have the advantage of affording a greater freedom of design in sizing and definition of the mechanical characteristics of the mobile electrode 10 (and of the corresponding membrane).

The second embodiment, described with reference to FIG. 7, may instead offer the specific advantage of a smaller thickness along the vertical axis z for the package 20.

Finally, it is clear that modifications and variations may be made to what is described and illustrated herein, without thereby departing from the scope of the present disclosure.

In particular, it is evident that the materials used for providing the sensing structure 3 may differ from the ones previously mentioned. Furthermore, sizing of the various elements of the sensing structure 3 may differ from the one illustrated.

Figure 15:
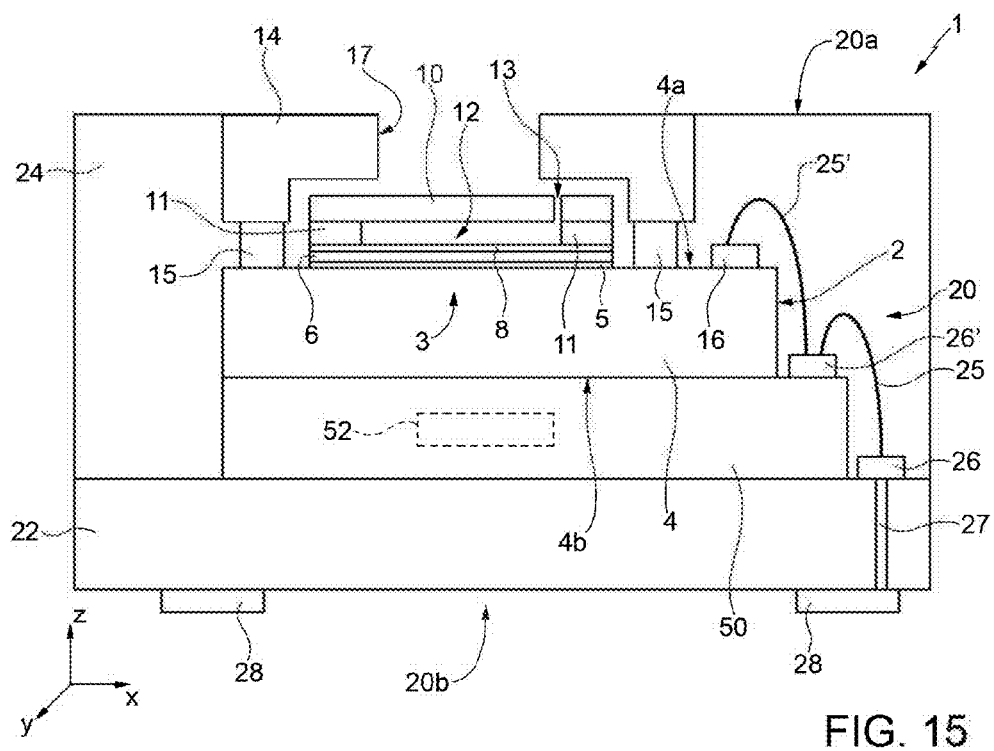
FIG. 15 is a schematic cross-sectional view of a MEMS force sensor according to a further embodiment of the present solution.

As shown in FIG. 15, the MEMS force sensor 1 may advantageously comprise within the package 20 at least one further die 50, for example stacked underneath the substrate 4 of the die 2, integrating an ASIC 52, for processing the signals detected by the force sensing structure 3.

In particular, the ASIC 52 is in this case able to generate an electrical signal indicative of the force F, as a function of the capacitance of the sensing capacitor and, thus, of the contact surface between the mobile electrode 10 and the dielectric region 8.

In this embodiment, further electrical wire connections 25' and further electrical contact pads 26' are envisaged for electrical connection between the die 2 and the further die 50'.

Alternatively, the ASIC could be integrated within the substrate 4 of the same die 2.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A MEMS force sensor comprising:
a substrate;
a fixed electrode coupled to the substrate;
a mobile electrode suspended above the substrate and facing the fixed electrode, the mobile electrode and the fixed electrode defining a sensing capacitor, the mobile electrode including a hole extending from a surface adjacent to the fixed electrode to a surface opposite the surface adjacent to the fixed electrode, the mobile electrode being configured to undergo deformation in response to a force;
a dielectric material located on the fixed electrode and spaced apart from the mobile electrode by an air gap when the mobile electrode is in a rest condition, wherein the hole in the mobile electrode places the air gap in fluid communication with an environment that is external to the MEMS force sensor when the force sensor is in operation,
the mobile electrode including a contact surface that is configured to contact the dielectric material in response to the force, an area of the contact surface contacting the dielectric material increases as the force increases; and
a coating surrounding lateral edges of the mobile electrode, the coating having a surface that is coplanar with the surface of the mobile electrode opposite the surface adjacent to the fixed electrode.

2. The sensor according to claim 1, wherein the dielectric material has a dielectric constant that is higher than a dielectric constant of air.

3. The sensor according to claim 1, wherein the dielectric material comprises silicon nitride.

4. The sensor according to claim 1, wherein the mobile electrode is configured to abut the dielectric material in response to a force of a minimum threshold value.

5. The sensor according to claim 1, further comprising an anchorage region, wherein the mobile electrode has a membrane conformation and is anchored to the substrate by the anchorage region.

6. The sensor according to claim 5, wherein the mobile electrode has, in a horizontal plane, an extension defined by a perimeter and is anchored to the substrate by the extension and along the entire perimeter of the mobile electrode.

7. The sensor according to claim 1, further comprising elastic elements located at edge portions of the mobile electrode, wherein the mobile electrode is anchored to the substrate by the elastic elements.

8. The sensor according to claim 1, further comprising a package, wherein the mobile electrode defines part of an outer surface of the package and faces an external environment.

9. The sensor according to claim 1, wherein the fixed electrode and the dielectric material have a convex curved shape, facing the mobile electrode.

10. The sensor according to claim 1, comprising an integrated circuit configured to generate an electrical signal indicative of the force, the electrical signal being based on a capacitive variation of the sensing capacitor that is a function of the increasing area of the contact surface between the mobile electrode and the dielectric material.

11. An electronic apparatus, comprising:
a microprocessor unit; and
a MEMS force sensor coupled to the microprocessor unit, the MEMS force senor including:
a substrate;
a fixed electrode coupled to the substrate;
a spacer coupled to the substrate, the spacer having a first thickness;
a mobile electrode coupled to the substrate and suspended above the fixed electrode, the mobile electrode being a semiconductor material and including a through hole, the mobile electrode and the fixed electrode defining a sensing capacitor, the mobile electrode having a second thickness, the first thickness less than the second thickness; and
a dielectric material located between the fixed and mobile electrode and a distance from the mobile electrode such that an air gap is between the mobile electrode and the dielectric material, wherein when the MEMS force sensor is in operation, the through hole remains open and in fluid communication with the sir gap and an environment that is external to the MEMS force sensor, wherein when the MEMS force sensor is in operating, the mobile electrode is configured to abut the dielectric material at a contact surface in response to a force being applied to the mobile electrode, wherein an area of the contact surface increases as the force increases.

12. The electronic apparatus according to claim 11, wherein the dielectric material comprises silicon nitride.

13. The electronic apparatus according to claim 11, further comprising an integrated circuit electrically coupled to the MEMS force sensor, the integrated circuit being configured to receive, from the MEMS force sensor, a signal indicative of the force being applied to the mobile electrode.

14. The electronic apparatus according to claim 13, wherein the MEMS force sensor is coupled to a surface of the integrated circuit.

15. The electronic apparatus according to claim 11, wherein the electronic apparatus is at least one of a tablet, a smartphone, a digital audio player, a photographic camera, a video camera, a wearable device, and a console for videogames.

16. The electronic apparatus according to claim 11, further comprising:
a coating surrounding edges of the spacer and edges of the mobile electrode, the coating having a thickness at least as great as the first thickness plus the second thickness.

17. The electronic apparatus according to claim 11, further comprising a coating surrounding lateral edges of the mobile electrode, the coating having a surface that is coplanar with a surface of the mobile electrode opposite a surface adjacent to the fixed electrode.

18. A method for sensing a force using a MEMS force sensor, the method comprising:
through a hole in the mobile electrode, equalizing air between the mobile electrode and the fixed electrode with air external to the MEMS force sensor;
while the hole in the mobile electrode remains open, applying forces to a mobile electrode of semiconductor material that is suspended above a fixed electrode and a dielectric material, the dielectric material being located above the fixed electrode; and
in response to the forces, the mobile electrode deforming and contacting a portion of the dielectric material at a contact surface, wherein when the forces applied increase, the contact surface increases.

19. The method according to claim 18, wherein the forces are above a minimum detectable value such that the mobile electrode contacts the portion of the dielectric material and determine a non-zero value for the contact surface.

20. The method according to claim 18, wherein the minimum detectable value is a value that causes the mobile electrode to contact the portion of the dielectric material at the contact surface.

21. The method according to claim 18, wherein a coating surrounds lateral edges of the mobile electrode, the coating having a surface that is coplanar with a surface of the mobile electrode opposite a surface adjacent to the fixed electrode.

* * * * *

UNITED STATES PATENT AND TRADEMARK OFFICE
CERTIFICATE OF CORRECTION

PATENT NO. : 10,024,738 B2
APPLICATION NO. : 14/539640
DATED : July 17, 2018
INVENTOR(S) : Sebastiano Conti et al.

Page 1 of 1

It is certified that error appears in the above-identified patent and that said Letters Patent is hereby corrected as shown below:

In the Claims

Column 10, Line 4:
"senor" should read, --sensor--.

Column 10, Line 9:
"a mobile electrode coupled to the substrate" should read, --a mobile electrode coupled to the spacer--.

Column 10, Line 22:
"sir" should read, --air--.

Signed and Sealed this
Thirtieth Day of October, 2018

Andrei Iancu
*Director of the United States Patent and Trademark Office*